US 11,522,437 B1

United States Patent
Sangsefidi et al.

(10) Patent No.: US 11,522,437 B1
(45) Date of Patent: Dec. 6, 2022

(54) CONTROLLERS, DEVICES, AND METHODS FOR DIRECTLY CONTROLLING A DUAL ACTIVE BRIDGE CONVERTER

(71) Applicant: Rivian IP Holdings, LLC, Plymouth, MI (US)

(72) Inventors: Younes Sangsefidi, Irvine, CA (US); Vishnu Mohan, Jersey City, NJ (US); Kang Wang, Palos Verdes Estates, CA (US); Chou Yeh, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/411,185

(22) Filed: Aug. 25, 2021

(51) Int. Cl.
*H02M 3/335* (2006.01)
*H02M 1/00* (2006.01)
*H02M 1/44* (2007.01)
*H02M 3/155* (2006.01)

(52) U.S. Cl.
CPC .......... *H02M 1/0043* (2021.05); *H02M 1/44* (2013.01); *H02M 3/33592* (2013.01); *H02M 3/155* (2013.01); *H02M 3/33569* (2013.01); *H02M 3/33573* (2021.05); *H02M 3/33576* (2013.01)

(58) Field of Classification Search
CPC ............... H02M 1/0043; H02M 3/335; H02M 3/33569; H02M 3/33573; H02M 3/33576; H02M 3/33592
See application file for complete search history.

(56) References Cited

U.S. PATENT DOCUMENTS

| | | | | |
|---|---|---|---|---|
| 9,987,937 B1* | 6/2018 | Mohamed | ............. | B60L 53/305 |
| 10,804,808 B1* | 10/2020 | Fu | .................... | H02M 3/33507 |
| 2015/0049518 A1* | 2/2015 | Harrison | ............. | H02M 7/4807 |
| | | | | 363/17 |
| 2021/0249963 A1* | 8/2021 | Kajiyama | ......... | H02M 3/33573 |

* cited by examiner

Primary Examiner — Gary L Laxton
(74) Attorney, Agent, or Firm — Clements Bernard Baratta; Christopher L. Bernard (57) ABSTRACT

Various disclosed embodiments include illustrative controller modules, direct current (DC) fast charging devices, and methods. In an illustrative embodiment, a controller module for a DC-DC converter includes a controller and computer-readable media configured to store computer-executable instructions configured to cause the controller to: receive an input voltage, an output voltage, and a requested power value. The computer-executable instructions are configured to cause the controller to: determine primary and secondary side inter-bridge phase shifts responsive to the requested power value, the input voltage, and the output voltage; determine an effective phase shift value responsive to the requested power value, the input voltage, the output voltage, and the primary side inter-bridge phase shift; generate control signals for switches of the DC-DC converter responsive to the primary side inter-bridge phase shift, the secondary side inter-bridge phase shift, and the effective phase shift value; and output the generated control signals.

20 Claims, 10 Drawing Sheets

CONTROLLERS, DEVICES, AND METHODS FOR DIRECTLY CONTROLLING A DUAL ACTIVE BRIDGE CONVERTER

INTRODUCTION

The present disclosure relates to electric vehicle charging systems, and more particularly, to systems and related processes for directly controlling a dual active bridge converter including an isolated direct-current (DC)-DC converter to improve the dynamic performance of the DC-DC converter under varying load/battery conditions.

BRIEF SUMMARY

Various disclosed embodiments include illustrative controller modules, direct current (DC) fast charging devices, and methods.

In an illustrative embodiment, a controller module for a DC-DC converter includes a controller and computer-readable media configured to store computer-executable instructions configured to cause the controller to: receive an input voltage, an output voltage, and a requested power value; determine primary and secondary side inter-bridge phase shift values responsive to the requested power value, the input voltage, and the output voltage; determine an effective phase shift value responsive to the requested power value, the input voltage, the output voltage, and the primary side inter-bridge phase shift value; generate control signals for switches of the DC-DC converter responsive to the primary side inter-bridge phase shift value, the secondary side inter-bridge phase shift value, and the effective phase shift value; and output the generated control signals.

In another illustrative embodiment, a DC fast charging (FC) device includes an alternating current (AC)-DC converter configured to generate an input DC voltage $V_{in}$ in response to a received grid AC voltage, a dual active bridge (DAB) DC-DC converter configured to generate an output DC voltage $V_o$ in response to the input voltage $V_{in}$, and a controller module. The controller module includes a controller and computer-readable media configured to store computer-executable instructions configured to cause the controller to: receive an input voltage, an output voltage, and a requested power value; determine primary and secondary side inter-bridge phase shift values responsive to the requested power value, the input voltage, and the output voltage; determine an effective phase shift value responsive to the requested power value, the input voltage, the output voltage, and the primary side inter-bridge phase shift value; generate control signals for switches of the DC-DC converter responsive to the primary side inter-bridge phase shift value, the secondary side inter-bridge phase shift value, and the effective phase shift value; and output the generated control signals.

In another illustrative embodiment, a method for controlling a DC-DC converter includes: receiving an input voltage to the DAB DC-DC converter; receiving an output voltage from the DAB DC-DC converter; receiving a requested power value; determining a primary side inter-bridge phase shift value and a secondary side inter-bridge phase shift value responsive to the requested power value, the input voltage, and the output voltage; determining an effective phase shift value responsive to the requested power value, the input voltage, the output voltage, and the filtered primary side inter-bridge phase shift value; generating control signals for switches of the DAB DC-DC converter responsive to the filtered primary side inter-bridge phase shift value, the filtered secondary side inter-bridge phase shift value, and the filtered effective phase shift value; and outputting the generated control signals to the DAB DC-DC converter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controller modules, direct current fast charging (DCFC) devices, and methods.

Figure 1:
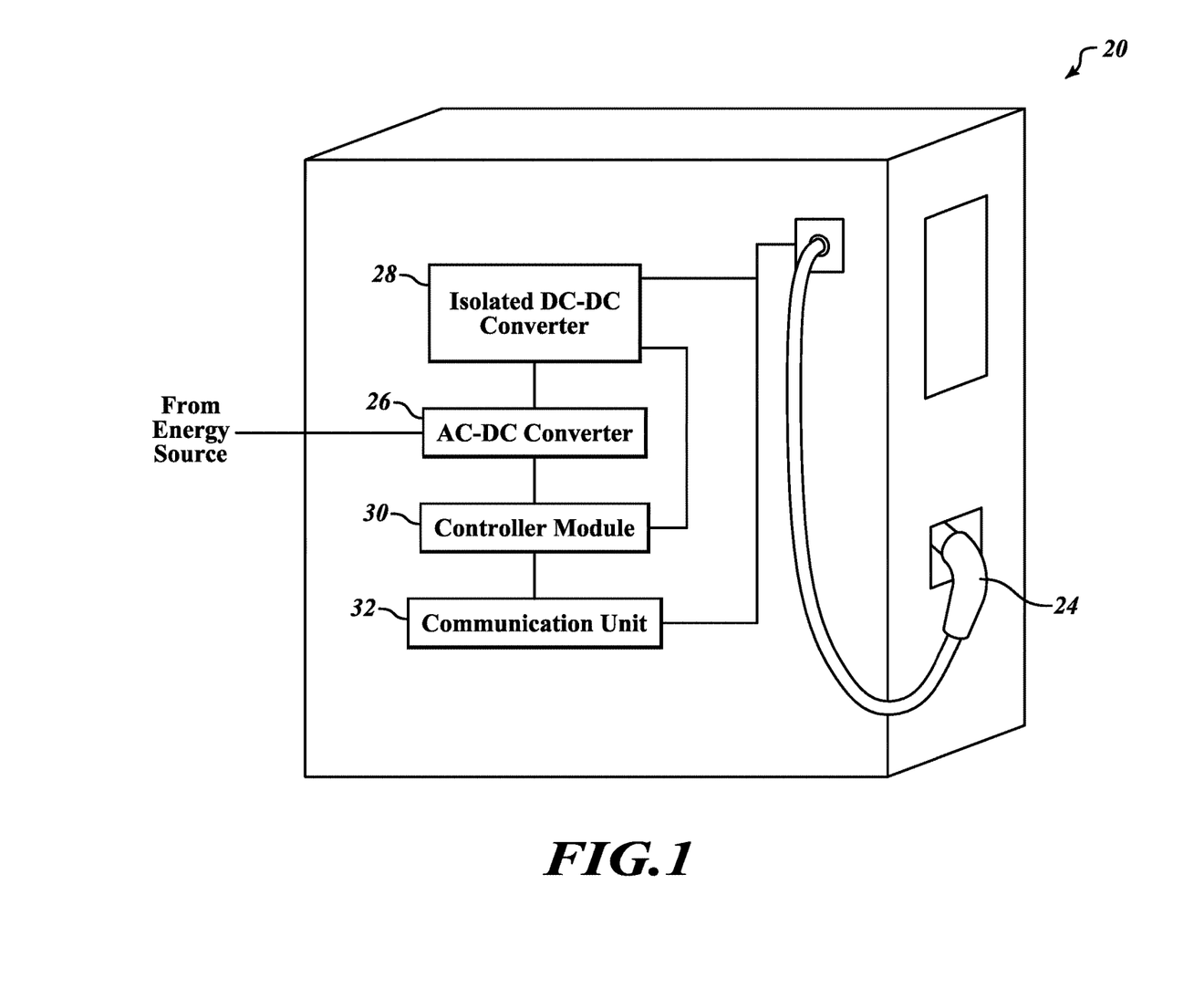
FIG. 1 is a block diagram in partial schematic form of an illustrative direct current fast charging (DCFC) unit.
Figure 2:
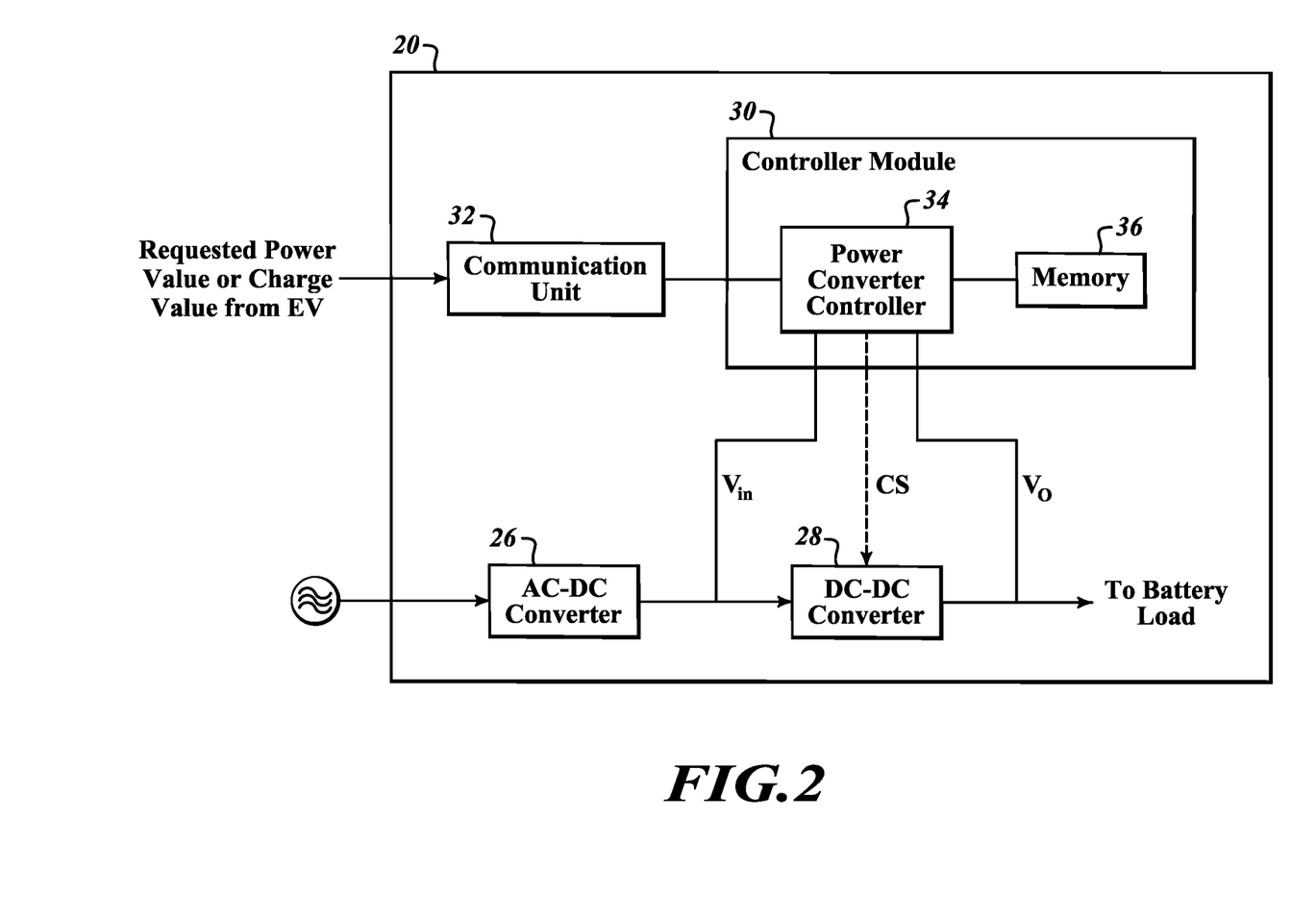
FIG. 2 is a block diagram of components of the DCFC unit of FIG. 1.

Referring to FIGS. 1 and 2 and by way of overview, in various illustrative embodiments a controller module 30 for a DC-DC converter 28 includes a controller 34 and computer-readable media, such as a memory 36, configured to store computer-executable instructions configured to cause the controller 34 to: receive an input voltage, an output voltage, and a requested power value; determine primary and secondary side inter-bridge phase shift values responsive to the requested power value, the input voltage, and the output voltage; determine an effective phase shift value responsive to the requested power value, the input voltage, the output voltage, and the primary side inter-bridge phase shift value; generate control signals for switches of the DC-DC converter 28 responsive to the primary side inter-bridge phase shift value, the secondary side inter-bridge phase shift value, and the effective phase shift value; and output the generated control signals.

As shown in FIG. 1 and still by way of overview, in various embodiments an illustrative direct current fast charging (DCFC) unit 20 is provided. In various embodiments the DCFC unit 20 is connected to an alternating current (AC) grid energy source and includes a connector 24 for attaching to input ports on an electric vehicle (EV) (not shown) or comparable battery load devices, such as, without limitation, portable rechargeable battery packs or backup power systems. Those skilled in the art will appreciate that the energy source may provide electrical power from a variety of different devices, such as wind turbine, solar cell, geothermal, or any mechanism that can produce electrical power. In various embodiment internal electronics of the DCFC unit 20 may include an AC-DC converter 26, the DC-DC converter 28 (such as a dual active bridge (DAB) DC-DC converter 28), the controller module 30, and a communication unit 32. The AC-DC converter 26 receives AC power from the AC grid energy source and converts the AC power to DC power that is delivered as input to the DAB DC-DC converter 28.

As shown in FIG. 2 and still by way of overview, in various embodiments (and as mentioned above) the DCFC unit 20 includes the controller module 30. In some such embodiments the controller module 30 includes the controller 34 (such as a power converter controller (PCC) 34) and the computer-readable media 36 (such as memory 36) configured to store computer-executable instructions. When the stored instructions are executed by the PCC 34, the PCC 34 receives command information from a connected EV and generates control signals for the AC-DC converter 26 and/or the DAB DC-DC converter 28 for providing regulated DC power for recharging batteries of the EV. It will be appreciated that, in various embodiments the PCC 34 generates the control signals without use of a current sensor(s)—as entailed by currently-known systems—for determining current value of electrical power outputted by the DAB DC-DC converter 28. Instead of measuring current with a sensor, in various embodiments the PCC 34, upon executing further instructions stored in the memory 36, generates control signals configured to control operation of the DAB DC-DC converter 28 responsive to the voltages received and outputted by the DAB DC-DC converter 28 and the received command information. Control signal generation will be described in more detail below.

To that end and continuing by way of overview, in various embodiments the controller module 30 for the DAB DC-DC converter 28 includes the PCC 34 and the memory 36 configured to store computer-executable instructions configured to cause the PCC 34 to receive a requested power value from the EV via the communication unit 32; receive an input voltage $V_{in}$ to the DAB DC-DC converter 28; receive an output DC voltage $V_o$ from the DAB DC-DC converter 28; generate control signals responsive to the received power value, the received input voltage $V_{in}$, and the received output voltage $V_o$; and output the generated control signals to the DAB DC-DC converter 28—without use of a current sensor(s). Operation of the PCC 34 is described in more detail below with reference to FIGS. 3-9.

As shown in FIG. 2, in various embodiments the AC-DC converter 26 generates an input DC voltage $V_{in}$. The DAB DC-DC converter 28 receives the input DC voltage $V_{in}$ and generates an output DC voltage $V_o$ for delivery to the battery load of the EV. The communication unit 32 receives a requested power value or charging value from the EV. The EV determines what power value is entailed for efficiently recharging the EV battery load. The EV sends the determined power value to the communication unit 32, such as by the connector 24, or wirelessly via a communication protocol, or the like.

Figure 3:
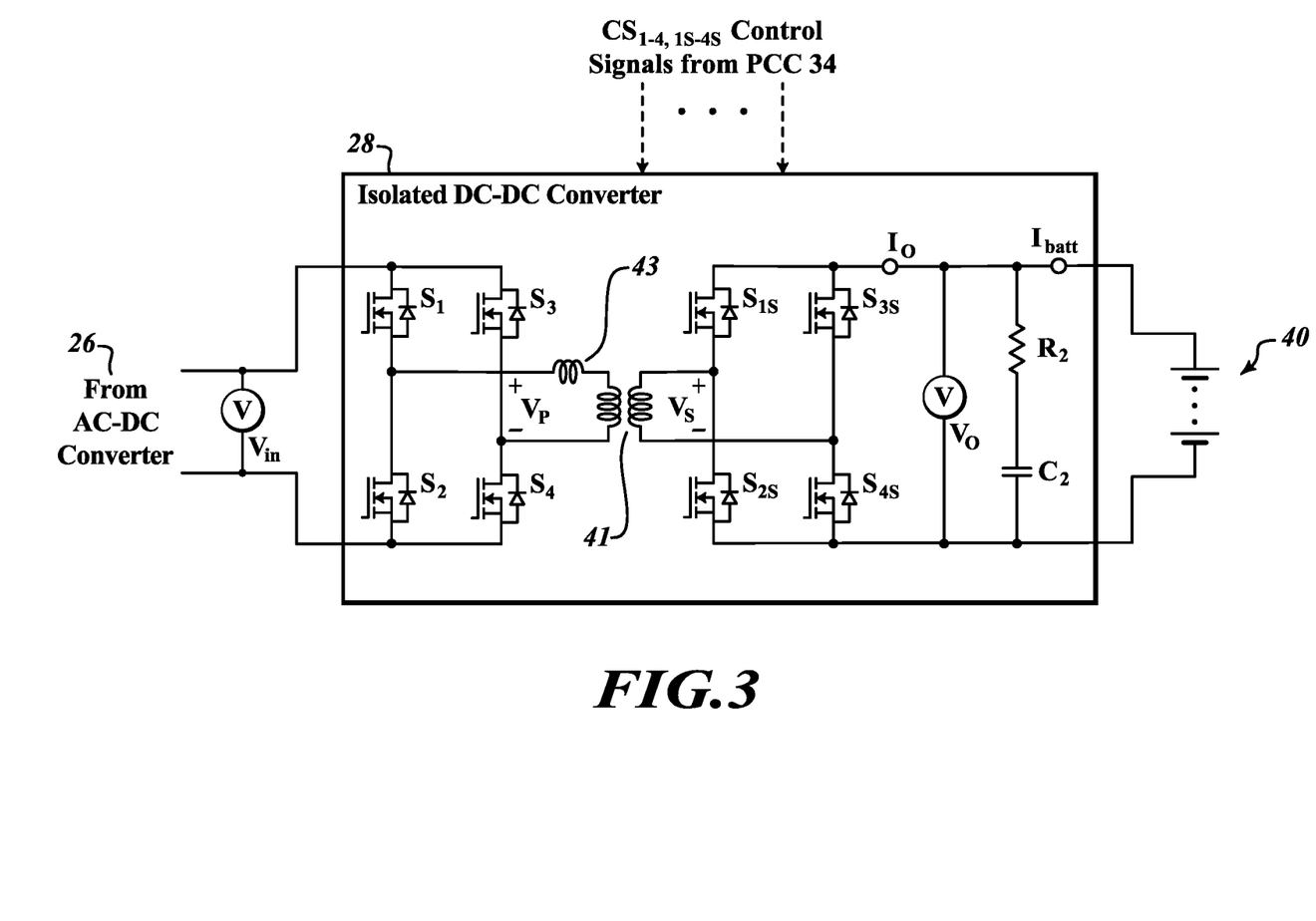
FIG. 3 is a block diagram in partial schematic form of an illustrative DC-DC converter of the DCFC unit of FIG. 1.

Referring additionally to FIG. 3, in various embodiments components of the DCFC unit 20 suitably are configured to perform power conversion. Given by way of non-limiting examples and as shown in FIG. 3, in various embodiments the control signals (CS) may include control signals $CS_{1-4}$ and $CS_{1S-4S}$ that are received by respective switching components, e.g., primary switches $S_{1-4}$ and secondary switches $S_{1S-4S}$ within the DAB DC-DC converter 28. In various embodiments the DAB DC-DC converter 28 may be an isolated DC-DC converter utilizing components, e.g., a transformer 41 and an inductor 43, to isolate an input set of switching components, e.g., the primary switches $S_{1-4}$ from an output set of switching components, e.g., the secondary switches $S_{1S-4S}$. The control signals $CS_{1-4}$ and $CS_{1S-4S}$ control the primary switches $S_{1-4}$ and the secondary switches $S_{1S-4S}$, thereby controlling a phase offset between the primary switches $S_{1-4}$ and the secondary switches $S_{1S-4S}$. Illustrative control signals $CS_{1-4}$ and $CS_{1S-4S}$ for the switches $S_{1-4}$ and $S_{1S-4S}$ are shown in more detail below in FIGS. 5 and 6. Other circuit components, such as resistors (e.g., $R_2$), capacitors (e.g., $C_2$) and others not shown, may be included for altering output signal and signal response.

Figure 4:
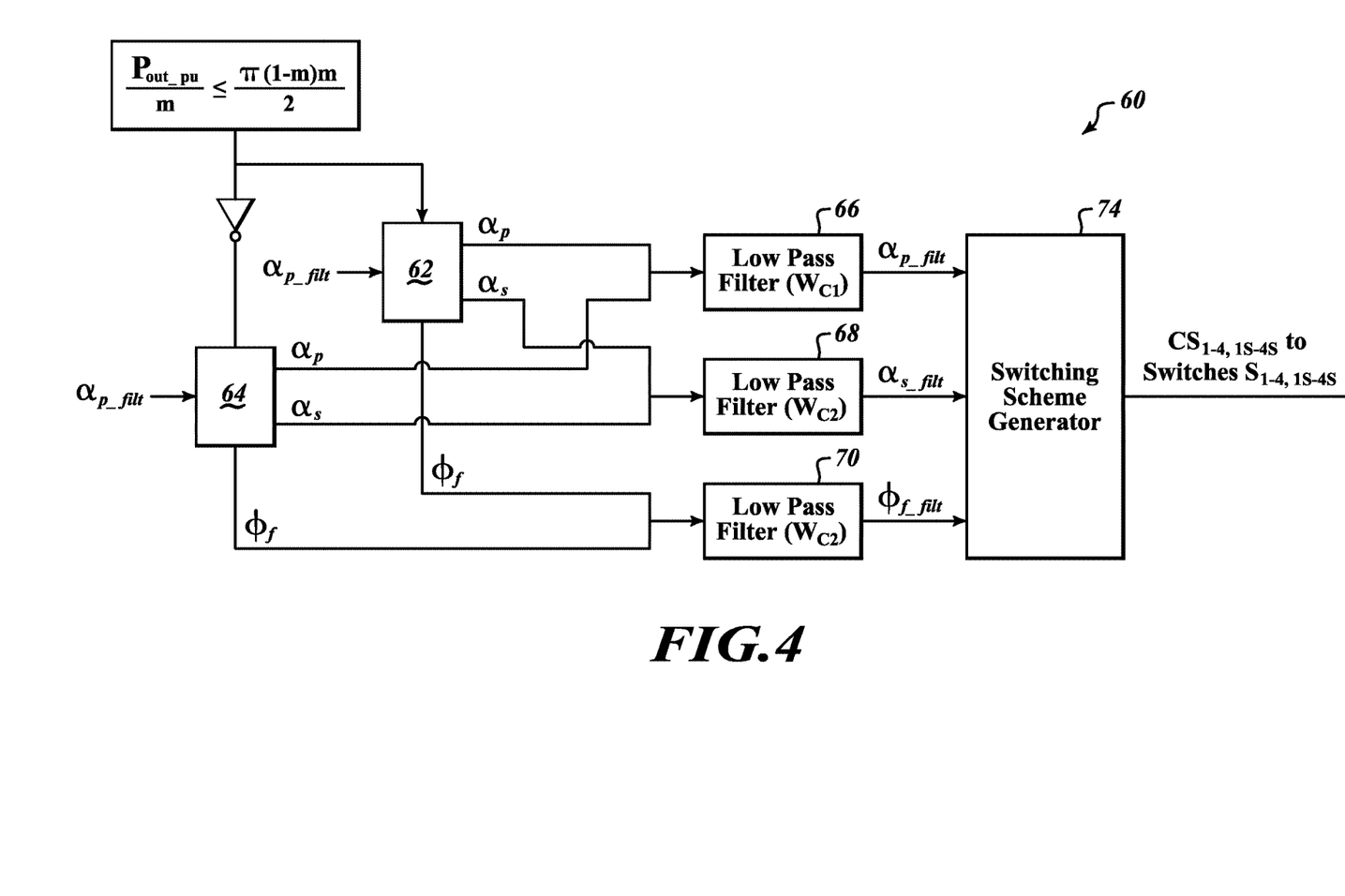
FIG. 4 is a control diagram of functions performed by a controller of FIG. 2.

Referring additionally to FIG. 4, in various embodiments the computer-executable instructions stored in the memory 36 are configured to cause the PCC 34 to determine one of two regions associated with the requested power value. This is shown in a control diagram 60. In the control diagram 60, analysis is performed in different regions based on a relationship of outputted power and inputted power. This relationship of outputted power and inputted power is $P_{out\_pu}$. A first power region may be identified by Eq. (1) below:

$$\frac{P_{out\_pu}}{m} \le \frac{\pi(1-m)m}{2}. \qquad \text{Eq. (1)}$$

A second power region may be identified by Eq. (2) below:

$$\frac{P_{out\_pu}}{m} \ge \frac{\pi(1-m)m}{2}. \qquad \text{Eq. (2)}$$

The following values are used in Eqs. (1) and (2) above.

$$m = \frac{N_{ps}V_o}{V_i}$$

$$P_{out\_pu} = \frac{P_{out}}{P_{base}}$$

$$P_{out} = V_{out}I_{out}$$

$$P_{base} = V_{in\_dc}^2/X_l$$

$$X_l = 2\pi f_{sw}L_c$$

Nps—Primary to secondary turns ratio
Vo—DAB Output voltage
Vin—DAB Input voltage
$L_c$—Leakage inductance of DAB
$f_{sw}$—Switching frequency
$P_{out}=P_{ref}$ (requested power from EV).
v$N_{ps}$ is a ration of the number of coil turns bon the primary side of the transformer 41 to the number of coil turns on the secondary side of the transformer 41. Lc and $f_{sw}$ are system parameters determined by system analysis.

The actions performed at blocks 62 and 64 are part of an iteration process. Thus, the equations described below include values determined at a later point in time and fed back as inputs to the equations used in blocks 62 and 64.

Responsive to the first power region being identified (e.g., using an algorithm based on Eq. (1)), the computer-executable instructions stored in the memory 36 are configured to cause the PCC 34 to determine a primary side inter-bridge phase shift ($\alpha_p$) responsive to the requested power value, the input voltage $V_{in}$ and the output voltage $V_o$. See Eq. (3):

$$\alpha_p = \pi - \frac{2m}{1-m}\phi_f, \qquad \text{Eq. (3)}$$

$\phi_f$—Effective or fundamental phase shift.

The primary side inter-bridge phase shift ($\alpha_p$) is a phase shift value between switch $S_1$ and switch $S_3$ on the primary side of the DAB DC-DC converter 28.

Also, responsive to the first power region being identified, the computer-executable instructions stored in the memory 36 are configured to cause the PCC 34 to determine a secondary side inter-bridge phase shift ($\alpha_s$) responsive to the requested power value, the input voltage $V_{in}$ and the output voltage $V_o$. See Eq. (4):

$$\alpha_s = \pi - \frac{2}{1-m}\phi_f. \qquad \text{Eq. (4)}$$

The secondary side inter-bridge phase shift ($\alpha_s$) is a phase shift value between switch $S_{1S}$ and switch $S_{3S}$ on the secondary side of the DAB DC-DC converter 28.

Also, responsive to the first power region being identified, the computer-executable instructions stored in the memory 36 are configured to cause the PCC 34 to determine an effective phase shift value ($\phi_f$) responsive to the requested power value, the input voltage $V_{in}$, the output voltage $V_o$, and the filtered primary side inter-bridge phase shift ($\alpha_p$). See Eq. (5):

$$\phi_f = \frac{\pi P_{out\_pu}}{m(\pi - \alpha_p)}. \qquad \text{Eq. (5)}$$

The primary side inter-bridge phase shift ($\alpha_p$) used in Eq. (5) may be a filtered primary side inter-bridge phase shift ($\alpha_{p\_filt}$) that is generated after passing through a filtering block 66.

Responsive to the second power region being identified (e.g., using an algorithm based on Eq. (2)), the computer-executable instructions stored in the memory 36 are configured to cause the PCC 34 to determine the primary side inter-bridge phase shift ($\alpha_p$) responsive to the requested power value, the input voltage $V_{in}$, and the output voltage $V_o$. See Eq. (6):

$$\alpha_p = (-2\phi_f + \pi)\left(\frac{1-m}{m}\right). \qquad \text{Eq. (6)}$$

Also, responsive to the second power region being identified, the computer-executable instructions stored in the memory 36 are configured to cause the PCC 34 to set the secondary side inter-bridge phase shift ($\alpha_s$) to zero (0).

Also, responsive to the second power region being identified, the computer-executable instructions stored in the memory 36 are configured to cause the PCC 34 to determine the effective phase shift value ($\phi_f$) responsive to the requested power value, the input voltage $V_{in}$, the output voltage $V_o$, and the filtered primary side inter-bridge phase shift ($\alpha_p$). See Eq. (7):

$$\phi_f = \frac{\pi}{2} - \frac{\sqrt{\pi^2 - \left(\frac{4\pi}{m}\right)\cdot P_{out\,pu} - \alpha_p^2}}{2}. \qquad \text{Eq. (7)}$$

The primary side inter-bridge phase shift ($\alpha_p$) used in Eq. (7) may be a filtered primary side inter-bridge phase shift ($\alpha_{p\_filt}$) that is generated after passing through a filtering block 66.

The results of Eq. (3-7) are filtered by low pass filters (filtering blocks 66-70). In various embodiments the low pass filters 66-70 are deterministic, because the low pass filters 66-70 do not depend on operating conditions of the system as would be the case with a proportional-integrator (PI) controller. In nonlinear systems, a PI controller exhibits variable dynamics.

The first low pass filter (the filtering block 66) filters the primary side inter-bridge phase shift ($\alpha_p$) using a first cut-off frequency ($w_{c1}$) to produce a filtered primary side inter-bridge phase shift ($\alpha_{p\_filt}$). The second low pass filter (the filtering block 68) filters the secondary side inter-bridge phase shift ($\alpha_s$) using a second cut-off frequency ($w_{c2}$) to produce a filtered secondary side inter-bridge phase shift ($\alpha_{s\_filt}$). The third low pass filter (the filtering block 70) filters the effective phase shift value ($\phi_f$) using a third cut-off frequency ($w_{c3}$) to produce a filtered effective phase shift value ($\phi_{f\_filt}$). In various embodiments the second cut-off frequency ($w_{c2}$) and the third cut-off frequency ($w_{c3}$) are equivalent. The filtered primary side inter-bridge phase shift ($\alpha_{p\_filt}$), the filtered secondary side inter-bridge phase shift ($\alpha_{s\_filt}$), and the filtered effective phase shift value ($\phi_{f\_filt}$) are sent to a control signal generator 74 configured to generate the control signals $CS_{1-4}$ and $CS_{1S-4S}$ that are sent to the primary switches $S_{1-4}$ and the secondary switches $S_{1S-4S}$. In various embodiments the first cut-off frequency ($w_{c1}$) is larger than the second cut-off frequency ($w_{c2}$). The cut-off frequencies may be predefined by a designer of the transformer. The cut-off frequencies may also be adjustable.

Figure 5:
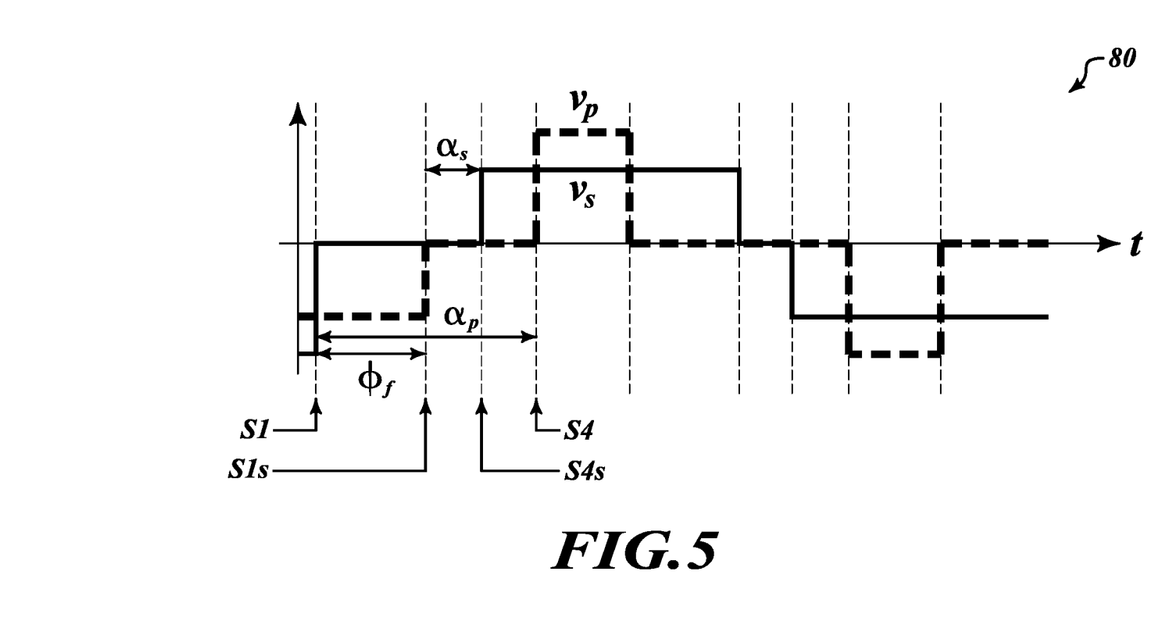
FIGS. 5 and 6 are graphs of waveforms generated by the controller of FIG. 2.

Referring additionally to FIG. 5, in various embodiments an illustrative graph 80 includes primary side voltage $V_P$ ($v_P$), secondary side voltage $V_S$ ($v_S$), and locations in time of activation of switches $S_1$, $S_4$, $S_{1S}$, and $S_{4S}$ performed in the first power region described above. $\alpha_p$ is the primary side inter-bridge phase shift. $\alpha_s$ is the secondary side inter-bridge phase shift. $\alpha_s$ The The timing of the switch activations shown are chosen in order to generate the effective phase shift value ($\phi_f$) of Eq. (5) in the first power region. The relationship of the values shown are theoretical and may be used in various embodiments. Other embodiments, such as that shown in FIG. 4, include the filtering of the theoretical values shown in FIG. 5.

Figure 6:
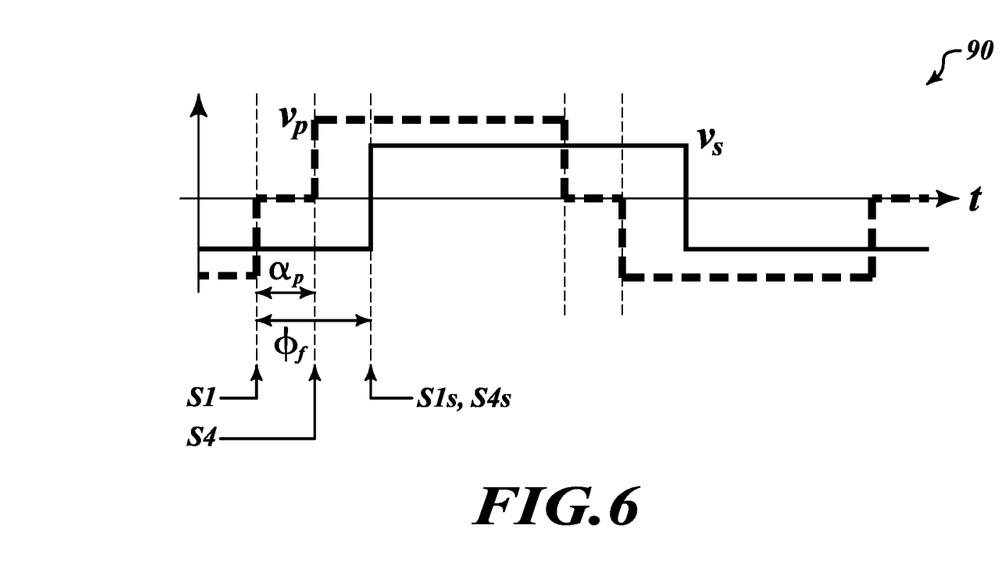

Referring additionally to FIG. 6, in various embodiments an illustrative graph 90 includes primary side voltage $V_P$ ($v_P$), secondary side voltage $V_S$ ($v_S$), and locations in time of activation of control signals for switches $S_1$, $S_4$, $S_{1S}$, and $S_{4S}$. $\alpha_p$ is the primary side inter-bridge phase shift. The timing of switch activations shown are chosen in order to generate the effective phase shift value ($\phi_f$) of Eq. (7) in the second power region. The relationship of the values shown are theoretical and may be used in various embodiments. Other embodiments, such as that shown in FIG. 4, include the filtering of the theoretical values shown in FIG. 5.

Figure 7:
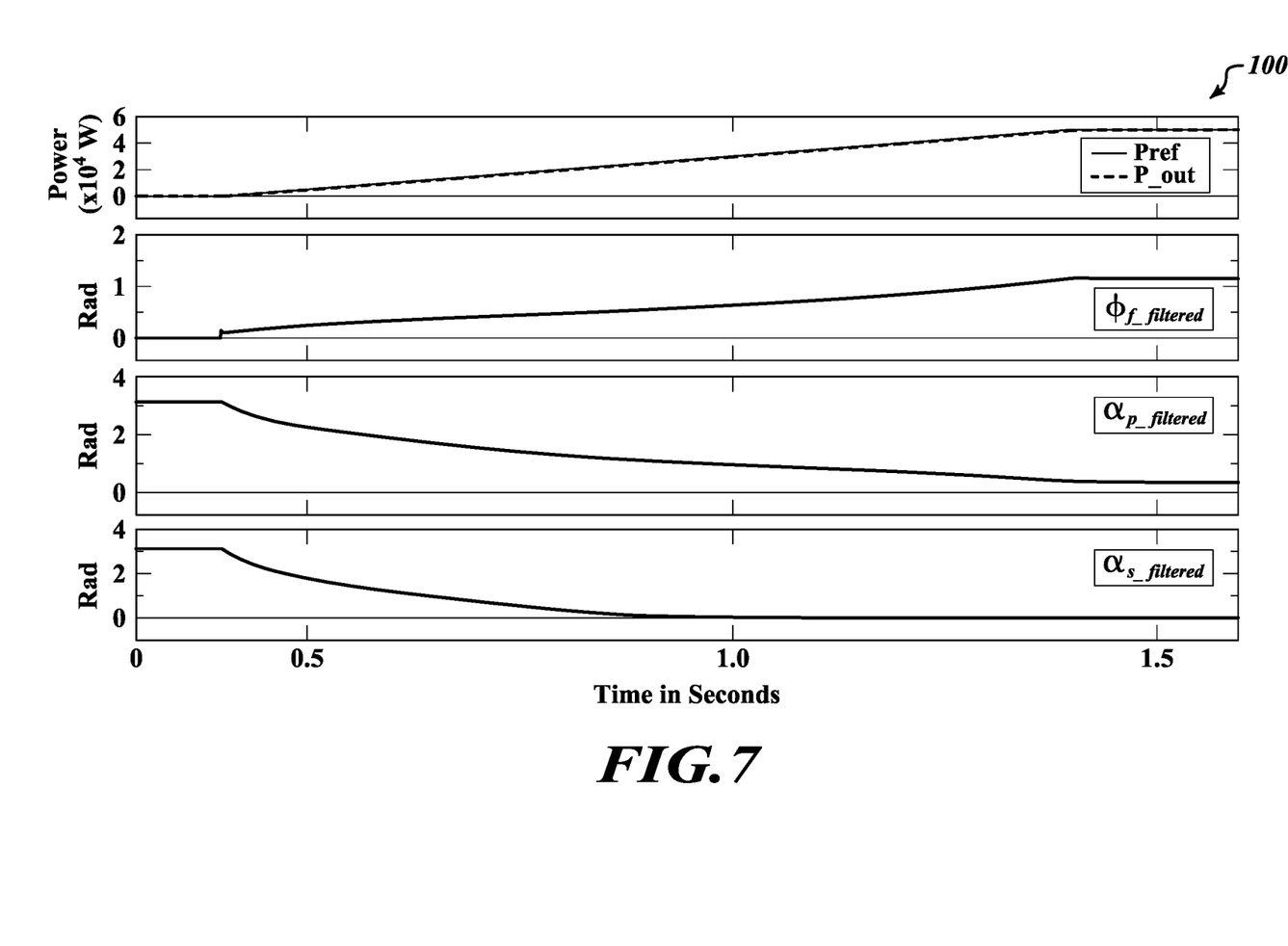
FIGS. 7-9 are graphs of power output results generated by the controller of FIG. 2.

Referring additionally to FIG. 7, in various embodiments an illustrative result 100 of the control process described above provides a power output $P_{out}$ (P_out) that tracks with requested power $P_{ref}$ (Pref) when the requested power $P_{ref}$ increases smoothly from 0 to 50 kW. The illustrative result 100 includes the change in the filtered values ($\phi_{f\_filt}$, $\alpha_{p\_filt}$, and $\alpha_{s\_filt}$) during this control process.

Figure 8:
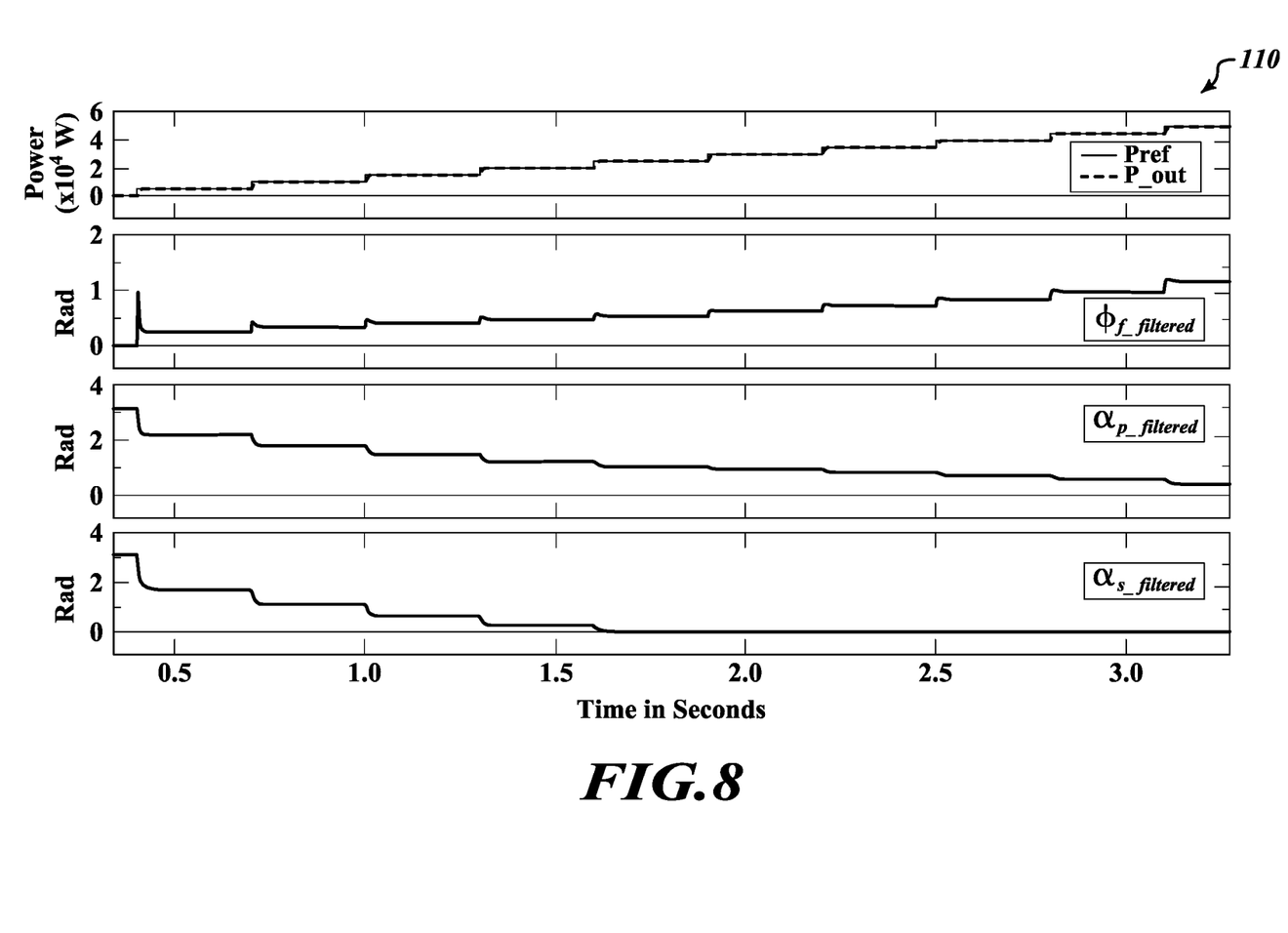
Figure 9:
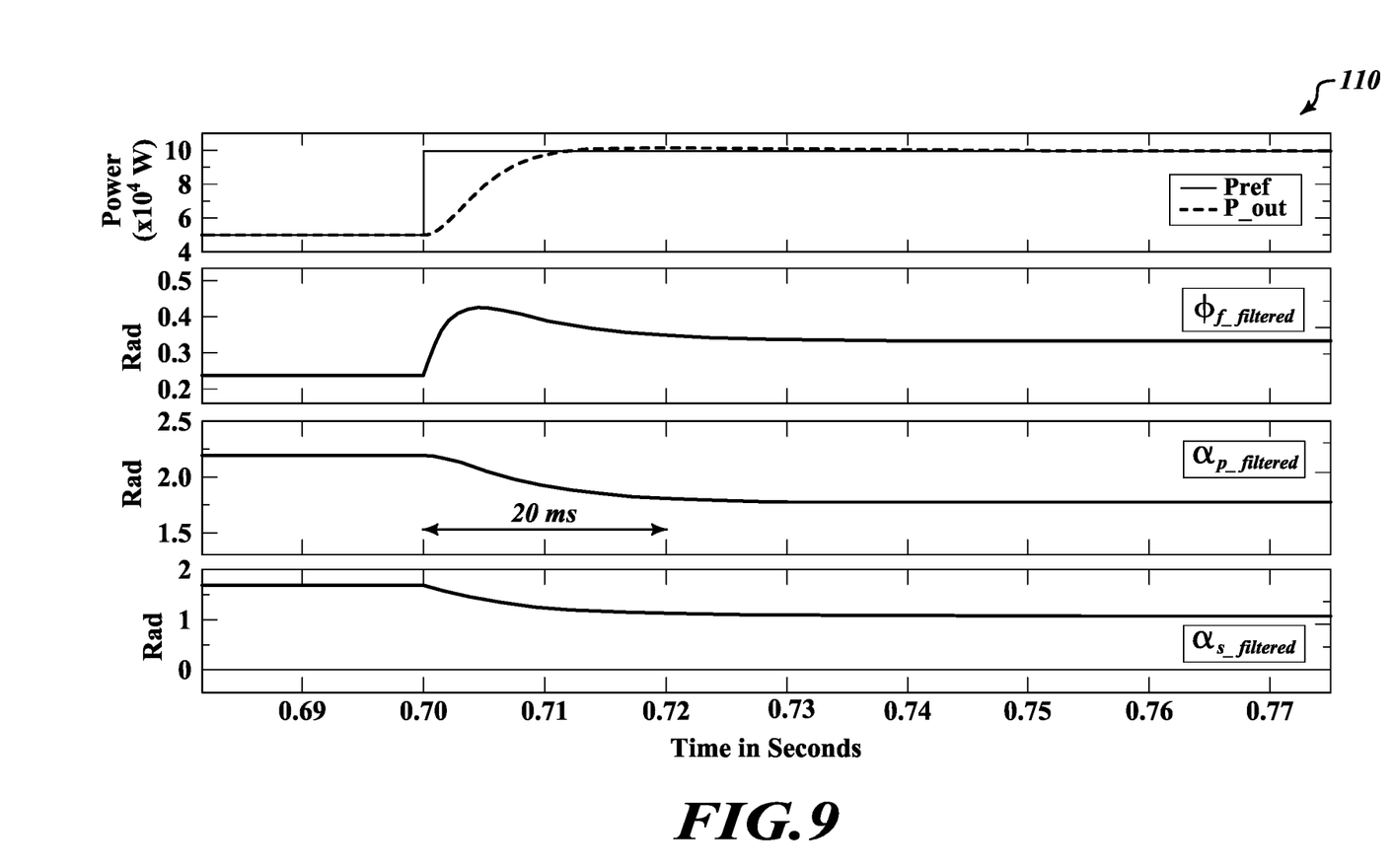

Referring additionally to FIGS. 8 and 9, in various embodiments an illustrative result 110 of the control process described above provides a power output $P_{out}$ (P_out) that tracks with requested power $P_{ref}$ (Pref) when the requested power $P_{ref}$ increases in steps from 0 to 50 kW. The illustrative result 110 in FIG. 9 is an expansion of the second step of the requested power $P_{ref}$ of FIG. 8. The illustrative result 110 includes the change in the filtered values ($\phi_{f\_filt}$, $\alpha_{p\_filt}$, and $\alpha_{s\_filt}$) during this control process. In various embodiments, time constants for the low pass filters (the filtering blocks 66-70 (FIG. 4)) may be $t\phi_f$=2 ms, $t\alpha_p$=20 ms, and $t\alpha_s$=20 ms. Other time constants may be used in order to vary appropriate response dynamics. The dynamics of the response to the step requested power $P_{ref}$ is comparable to the dynamics of the low pass filters (the filtering block 66-70 (FIG. 4)).

Figure 10:
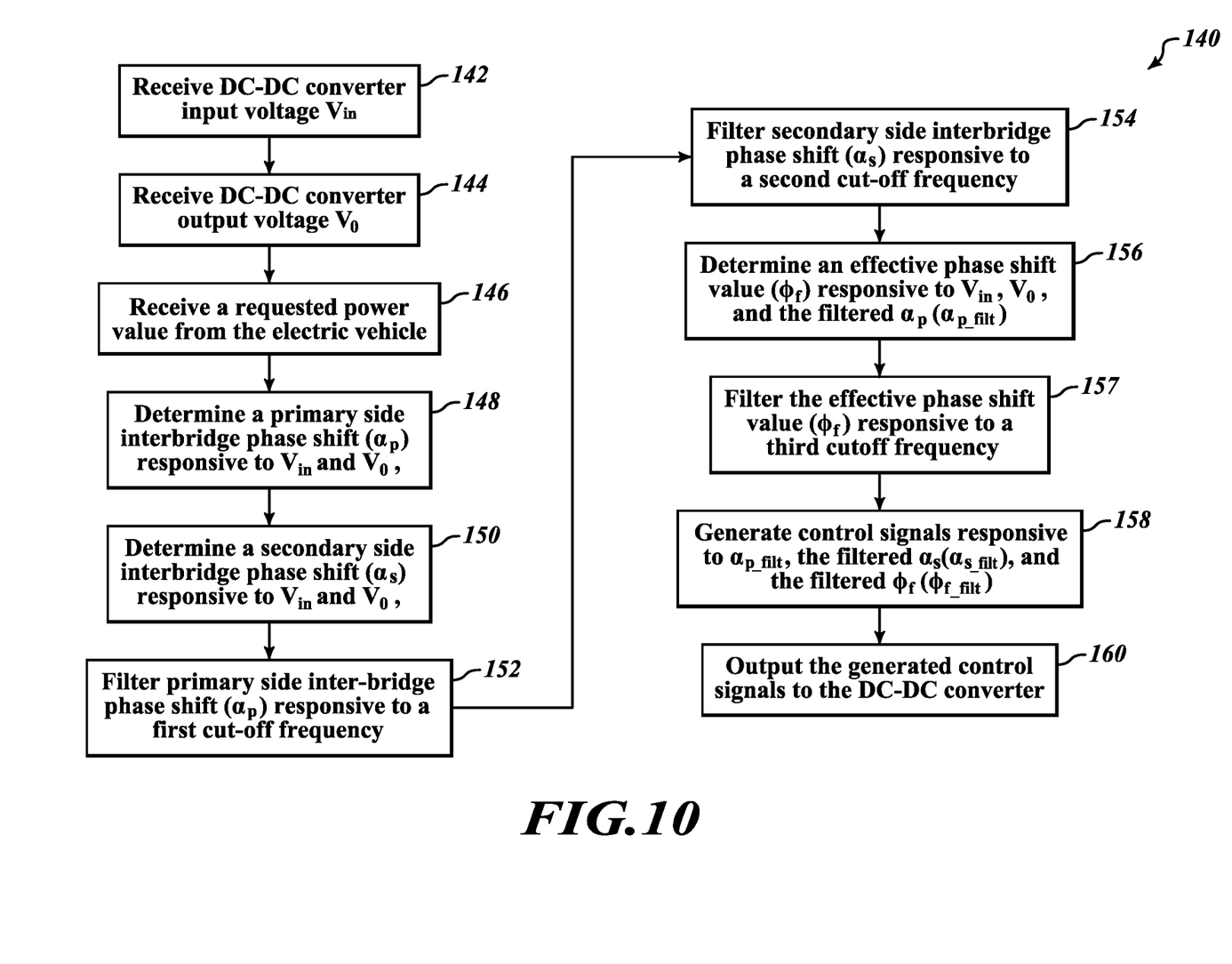
FIG. 10 is a flow chart of an illustrative method for generating power converter control signals.

Referring now to FIG. 10, in various embodiments an illustrative method 140 is provided for generating power converter control signals for a DAB DC-DC converter. It will be appreciated that, in some embodiments the method 140 may be suited for being performed by a controller module and/or a power converter controller executing instructions stored in a memory. At blocks 142 and 144, an input voltage ($V_{in}$) and an output voltage ($V_o$) of a DC-DC converter are received by a controller. At a block 146, a requested power value is received from a battery load device, such as an EV. At a block 148, a primary side inter-bridge phase shift value ($\alpha_p$) is determined responsive to the received input voltage and the output voltage. At a block 150, a secondary side inter-bridge phase shift value ($\alpha_s$) is determined responsive to the received input voltage and the output voltage. At a block 152, the primary side inter-bridge phase shift value is filtered responsive to a first cut-off frequency. At a block 154, the secondary side inter-bridge phase shift value is filtered responsive to a second cut-off frequency. At a block 156, an effective phase shift value ($\phi_f$) is determined responsive to the input voltage, the output voltage, and the filtered primary side inter-bridge phase shift value ($\alpha_{p\_filt}$). At a block 157, the effective phase shift value ($\phi_f$) is filtered responsive to a third cut-off frequency. At a block 158, control signals are generated responsive to the filtered primary side inter-bridge phase shift value, the filtered secondary side inter-bridge phase shift value ($\alpha_{s\_filt}$), and the filtered effective phase shift value ($\phi_{f\_filt}$). At the block 160 the generated control signals are outputted to switches of the DAB DC-DC converter.

In some embodiments, determination of the primary side inter-bridge phase shift value, the secondary side inter-bridge phase shift value, and the effective phase shift value is further responsive to a ratio of the amount of coil turns on a primary side of a transformer of the DAB DC-DC converter.

In some embodiments, the controller further identifies a first power region responsive to the requested power value being less than the value associated with the input voltage, the output voltage, and the ratio of the amount of coil turns, and identifies a second power region responsive to the requested power value being created than the value associated with the input voltage, the output voltage and the ratio of the amount of coil turns. The primary side inter-bridge phase shift value is determined responsive to a first algorithm (e.g., Eq. (3) above) associated with the identified first power region. The secondary side inter-bridge phase shift value is determined responsive to a second algorithm (e.g., Eq. (4) above) associated with the identified first power region. The phase shift value is determined responsive to a third algorithm (e.g., Eq. (5) above) associated with the identified first power region. The primary side inter-bridge phase shift value is determined responsive to fourth algorithm (e.g., Eq. (6) above) associated with the identified second power region. The secondary side inter-bridge phase shift value is made equal to zero responsive to the identified second power region. The effective phase shift value is determined responsive to fifth algorithm (e.g., Eq. (7) above) associated with the identified second power region.

In some embodiments, the requested power value is determined responsive to a requested power value from a device connected to the DAB DC-DC converter and a previously-defined base power value of the DAB DC-DC converter.

In some embodiments, the base power value is determined responsive to a previously defined switching frequency of the DAB DC-DC converter.

In some embodiments, the base power value is determined responsive to a previously defined leakage inductance value of the DAB DC-DC converter.

In some embodiments, the second cut-off frequency and the third cut-off frequency are equivalent.

It will be appreciated that the PCC 34 may be any type of controller as desired for a particular application, such as, without limitation, a microcontroller or the like. In various embodiments the PCC 34 may include one or more generic or specialized processors such as: microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. In some embodiment some or all functions may be implemented by a state machine that has no stored program instructions, or in one or more application-specific integrated circuits (ASICs), in which each function or some combinations of certain of the functions are implemented as custom logic or circuitry. It will be appreciated that a combination of the aforementioned approaches may be used. For some of the embodiments described herein, a corresponding device in hardware and optionally with software, firmware, and a combination thereof can be referred to as a "controller configured to" perform a set of operations, steps, methods, processes, algorithms, functions, techniques, etc. on digital and/or analog signals as described herein for the various embodiments.

As discussed above, various embodiments include the non-transitory computer-readable storage medium (e.g., the memory 36) having computer-readable code (instructions) stored thereon for causing the PCC 34 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the PCC 34 that, in response to such execution, causes performance of a set of operations, steps, methods, processes, algorithms, functions, techniques, etc. as described herein for the various embodiments.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller module for a dual active bridge (DAB) direct current (DC)-DC converter, the controller module comprising:
    a controller; and
    computer-readable media configured to store computer-executable instructions configured to cause the controller to:
        receive an input voltage, an output voltage, and a requested power value;
        determine primary and secondary side inter-bridge phase shift values responsive to the requested power value, the input voltage, and the output voltage;
        determine an effective phase shift value responsive to the requested power value, the input voltage, the output voltage, and the primary side inter-bridge phase shift value;
        generate control signals for switches of the DC-DC converter responsive to the primary side inter-bridge phase shift value, the secondary side inter-bridge phase shift value, and the effective phase shift value; and
        output the generated control signals.

2. The controller module of claim 1, wherein:
    the computer-executable instructions are further configured to cause the controller to:
        filter the primary side inter-bridge phase shift value responsive to a first predefined cut-off frequency, thereby generating a filtered primary side inter-bridge phase shift value;
        filter the secondary side inter-bridge phase shift value responsive to a second predefined cut-off frequency, thereby generating a filtered secondary side inter-bridge phase shift value; and
        filter the effective phase shift value responsive to a third predefined cut-off frequency, thereby generating a filtered effective phase shift value; and
    generating the control signals is further responsive to the filtered primary side inter-bridge phase shift value, the filtered secondary side inter-bridge phase shift value, and the filtered effective phase shift value.

3. The controller module of claim 2, wherein determining the effective phase shift value is further responsive to the filtered primary side inter-bridge phase shift value.

4. The controller module of claim 1, wherein determining the primary side inter-bridge phase shift value, the secondary side inter-bridge phase shift value, and the effective phase shift value are further responsive to a ratio of the amount of coil turns on a primary side of a transformer of the DAB DC-DC converter to the amount of coil turns on a secondary side of the transformer.

5. The controller module of claim 4, wherein the computer-executable instructions are further configured to cause the controller to:
identify a first power region responsive to the requested power value being less than a value associated with the input voltage, the output voltage, and the ratio; and
identify a second power region responsive to the requested power being greater than the value associated with the input voltage, the output voltage, and the ratio, wherein:
determining the primary side inter-bridge phase shift value is further responsive to a first algorithm associated with the identified first power region;
determining the secondary side inter-bridge phase shift value is further responsive to a second algorithm associated with the identified first power region;
determining the effective phase shift value is further responsive to a third algorithm associated with the identified first power region;
determining the primary side inter-bridge phase shift value is further responsive to a fourth algorithm associated with the identified second power region;
determining the secondary side inter-bridge phase shift value further includes assigning the secondary side inter-bridge phase shift value equal to zero responsive to the identified second power region; and
determining the effective phase shift value is further responsive to a fifth algorithm associated with the identified second power region.

6. The controller module of claim 5, wherein the computer-executable instructions are further configured to cause the controller to:
determine a base power value responsive to a previously defined switching frequency and a previously defined leakage inductance value of the DAB DC-DC converter; and
determine the requested power value responsive to a requested power value from a device connected to the DAB DC-DC converter and the base power value.

7. The controller module of claim 2, wherein the second cut-off frequency and the third cut-off frequency are equivalent.

8. A direct current fast charging (DCFC) unit comprising:
an alternating current (AC)-DC converter configured to generate an input DC voltage in response to a received AC voltage;
a DAB DC-DC converter configured to generate an output voltage in response to the input DC voltage; and
a controller module including:
a controller; and
computer-readable media configured to store computer-executable instructions configured to cause the controller to:
receive an input DC voltage, an output voltage, and a requested power value;
determine primary and secondary side inter-bridge phase shift values responsive to the requested power value, the input DC voltage, and the output voltage;
determine an effective phase shift value responsive to the requested power value, the input DC voltage, the output voltage, and the primary side inter-bridge phase shift value;
generate control signals for switches of the DC-DC converter responsive to the primary side inter-bridge phase shift value, the secondary side inter-bridge phase shift value, and the effective phase shift value; and
output the generated control signals.

9. The DCFC unit of claim 8, wherein:
the computer-executable instructions are further configured to cause the controller to:
filter the primary side inter-bridge phase shift value responsive to a first predefined cut-off frequency;
filter the secondary side inter-bridge phase shift value responsive to a second predefined cut-off frequency; and
filter the effective phase shift value responsive to a third predefined cut-off frequency; and
generating the control signals is further responsive to the filtered primary side inter-bridge phase shift value, the filtered secondary side inter-bridge phase shift value, and the filtered effective phase shift value.

10. The DCFC unit of claim 9, wherein determining the effective phase shift value is further responsive to the filtered primary side inter-bridge phase shift value.

11. The DCFC unit of claim 8, wherein determining the primary side inter-bridge phase shift value, the secondary side inter-bridge phase shift value, and the effective phase shift value are further responsive to a ratio of the amount of coil turns on a primary side of a transformer of the DAB DC-DC converter to the amount of coil turns on the secondary side of the transformer.

12. The DCFC unit of claim 11, wherein the computer-executable instructions are further configured to cause the controller to:
identify a first power region responsive to the requested power value being less than a value associated with the input DC voltage, the output voltage, and the ratio; and
identify a second power region responsive to the requested power being greater than the value associated with the input DC voltage, the output voltage, and the ratio,
wherein:
determining the primary side inter-bridge phase shift value is further responsive to a first algorithm associated with the identified first power region;
determining the secondary side inter-bridge phase shift value is further responsive to a second algorithm associated with the identified first power region;
determining the effective phase shift value is further responsive to a third algorithm associated with the identified first power region;
determining the primary side inter-bridge phase shift value is further responsive to a fourth algorithm associated with the identified second power region;
determining the secondary side inter-bridge phase shift value further includes assigning the secondary side inter-bridge phase shift value equal to zero responsive to the identified second power region; and determining the effective phase shift value is further responsive to a fifth algorithm associated with the identified second power region.

13. The DCFC unit of claim 12, wherein the computer-executable instructions are further configured to cause the controller to:
    determine a base power value responsive to a previously defined switching frequency and a previously defined leakage inductance value of the DAB DC-DC converter; and
    determine the requested power value responsive to a requested power value from a device connected to the DAB DC-DC converter and the base power value.

14. The DCFC unit of claim 9, wherein the second cut-off frequency and the third cut-off frequency are equivalent.

15. A method for controlling a DC-DC converter, the method comprising:
    receiving an input voltage to the DAB DC-DC converter;
    receiving an output voltage from the DAB DC-DC converter;
    receiving a requested power value;
    determining a primary side inter-bridge phase shift value and a secondary side inter-bridge phase shift value responsive to the requested power value, the input voltage, and the output voltage;
    determining an effective phase shift value responsive to the requested power value, the input voltage, the output voltage, and the filtered primary side inter-bridge phase shift value;
    generating control signals for switches of the DAB DC-DC converter responsive to the filtered primary side inter-bridge phase shift value, the filtered secondary side inter-bridge phase shift value, and the filtered effective phase shift value; and
    outputting the generated control signals to the DAB DC-DC converter.

16. The method of claim 15, further comprising:
    filtering the primary side inter-bridge phase shift value responsive to a first predefined cut-off frequency;
    filtering the secondary side inter-bridge phase shift value responsive to a second predefined cut-off frequency; and
    filtering the effective phase shift value responsive to a third predefined cut-off frequency the effective phase shift value responsive to a third predefined cut-off frequency,
    wherein:
        determining the effective phase shift value is further responsive to the filtered primary side inter-bridge phase shift value; and
        generating the control signals is further responsive to the filtered primary side inter-bridge phase shift value, the filtered secondary side inter-bridge phase shift value, and the filtered effective phase shift value.

17. The method of claim 15, wherein determining the primary side inter-bridge phase shift value, the secondary side inter-bridge phase shift value, and the effective phase shift value are further responsive to a ratio of the amount of coil turns on a primary side of a transformer of the DAB DC-DC converter to the amount of coil turns on the secondary side of the transformer.

18. The method of claim 17, further comprising:
    identifying a first power region responsive to the requested power value being less than a value associated with the input voltage, the output voltage, and the ratio; and
    identifying a second power region responsive to the requested power being greater than the value associated with the input voltage, the output voltage, and the ratio,
    wherein:
        determining the primary side inter-bridge phase shift value is further responsive to a first algorithm associated with the identified first power region;
        determining the secondary side inter-bridge phase shift value is further responsive to a second algorithm associated with the identified first power region;
        determining the effective phase shift value is further responsive to a third algorithm associated with the identified first power region;
        determining the primary side inter-bridge phase shift value is further responsive to a fourth algorithm associated with the identified second power region;
        determining the secondary side inter-bridge phase shift value further includes assigning the secondary side inter-bridge phase shift value equal to zero responsive to the identified second power region; and
        determining the effective phase shift value is further responsive to a fifth algorithm associated with the identified second power region.

19. The method of claim 18, further comprising:
    determining a base power value responsive to a previously defined switching frequency and a previously defined leakage inductance value of the DAB DC-DC converter; and
    determining the requested power value responsive to a requested power value from a device connected to the DAB DC-DC converter and the determined base power value.

20. The method of claim 16, wherein the second cut-off frequency and the third cut-off frequency are equivalent.

* * * * *